(12) United States Patent
Adams

(10) Patent No.: US 7,029,020 B2
(45) Date of Patent: *Apr. 18, 2006

(54) SWAY CONTROL CONVERSION BRACKET

(75) Inventor: Katherine A. Adams, Mishawaka, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/838,918

(22) Filed: May 4, 2004

(65) Prior Publication Data

US 2004/0207174 A1    Oct. 21, 2004

Related U.S. Application Data

(63) Continuation of application No. 10/107,971, filed on Mar. 27, 2002, now Pat. No. 6,746,036.

(60) Provisional application No. 60/280,294, filed on Mar. 30, 2001.

(51) Int. Cl.
*B60D 1/32* (2006.01)

(52) U.S. Cl. .............................. 280/455.1; 280/456.1; 280/457

(58) Field of Classification Search ............. 280/446.1, 280/447, 455.1, 456.1, 457, 458
See application file for complete search history.

(56) References Cited

U.S. PATENT DOCUMENTS

| 4,154,454 | A | * | 5/1979 | Lewin ..................... 280/455.1 |
| 5,868,414 | A | * | 2/1999 | McCoy et al. ........... 280/406.2 |
| 5,890,726 | A | * | 4/1999 | McCoy et al. ........... 280/406.1 |
| 6,746,036 | B1 | * | 6/2004 | Adams .................... 280/455.1 |

* cited by examiner

*Primary Examiner*—Lesley D. Morris
*Assistant Examiner*—L. Lum
(74) *Attorney, Agent, or Firm*—McDonald Hopkins Co., LPA; Robert H. Earp, III; Todd A. Benni

(57) ABSTRACT

A bracket, apparatus and method are provided for adapting a simple draw bar and hitch ball arrangement to allow connection to a sway control device. The bracket includes an aperture for receiving the threaded stem of the hitch ball, a notch for receiving and engaging the draw bar and a second aperture for receiving a sway control device connector such as a sway control ball. The bracket allows connection to any number of sway control devices available in the industry so that a simple draw bar and hitch ball may be converted for sway control capability.

13 Claims, 2 Drawing Sheets

SWAY CONTROL CONVERSION BRACKET

This application is a continuation of U.S. utility patent application Ser. No. 10/107,971 filed Mar. 27, 2002 now U.S. Pat. No. 6,746,036 which claims the benefit of U.S. Provisional Application Ser. No. 60/280,294 filed Mar. 30, 2001.

TECHNICAL FIELD

The present invention relates to the towing equipment field and, more particularly, to a method and apparatus for converting a simple draw bar and hitch ball arrangement in order to allow the addition of the sway control when towing a trailer.

BACKGROUND OF THE INVENTION

It has long been recognized that the conventional ball and socket interconnection between a trailer hitch on the towing vehicle such as an automobile or light truck and the trailer tongue of a towed vehicle such as a camper or other trailer permits the possibility of undesirable sway of the towed vehicle under certain operating conditions. Such conditions may result from rough, uneven or winding roads, environmental factors such as cross winds or even the suspension characteristics of the vehicles involved.

In order to minimize or eliminate sway a number of sway control devices have been developed including, for example, the trailer sway control device set forth in U.S. Pat. No. 4,165,885 to Good et al. and the friction sway control device presently sold by Reese Products, Inc. under part number 26660.

Generally, the ball mount heads of weight distributing hitch assemblies are equipped with a sway control ball connector for connection with such sway control devices. Such weight distributing hitch assemblies are generally relatively expensive and oftentimes an operator desires to equip a trailer for sway control but has no simultaneous need for weight distribution. Accordingly, the availability of combined weight distribution/sway control devices doesn't meet such an operator's needs.

In the previously mentioned U.S. Pat. No. 4,165,885 to Good et al., a sway control adaptor bar is secured directly to the draw bar by welding. By means of this system the operator may convert a simple draw bar and hitch ball arrangement to allow for sway control without the addition or in the absence of weight distribution. Many operators, however, would rather have a readily reversible conversion available so that the simple draw bar and hitch ball arrangement may be conveniently restored at any desired time. The present invention addresses this need.

SUMMARY OF THE INVENTION

In accordance with the present invention as described herein an apparatus is provided for converting a simple draw bar and hitch ball arrangement to allow sway control. The apparatus comprises a bracket including a notch for receiving and engaging the draw bar and a sway control connector connected to the bracket. The bracket also includes a hitch ball receiving aperture. That hitch ball receiving aperture is aligned with the notch.

The apparatus may be more fully described as comprising a bracket including a first section extending in a first plane and a second section extending in a second, different plane. The first and second sections of the racket include a notch for receiving and engaging the draw bar. The first section also includes a hitch ball receiving aperture and a sway control mounting aperture. The hitch ball receiving aperture is aligned with the notch. A sway control connector such as a ball connector is engaged in the sway control mounting aperture. The first and second planes may form an included angle of about 90°.

In accordance with yet another aspect of the present invention, a towing assembly is provided. That towing assembly includes a draw bar, a hitch ball and hitch ball fastener, a conversion bracket secured to the draw bar by means of the hitch ball and hitch ball fastener and a sway control assembly connected to the conversion bracket. As described above the conversion bracket includes a notch for receiving and engaging the draw bar and an aperture for receiving a stem of the hitch ball. Described more specifically, the conversion bracket includes first and second sections resting in different planes that form an included angle of about 90°.

In accordance with yet another aspect of the present invention, a method is provided for converting a simple draw bar and hitch ball arrangement to allow sway control for a trailer. The method includes the securing of a conversion bracket to the draw bar by means of the hitch ball and the connecting of a sway control device between the conversion bracket and the trailer. The method also includes the step of reversing the conversion by disconnecting the sway control device and removing the conversion bracket from the draw bar. This is accomplished by first removing the hitch ball.

In the following description there is shown and described one possible embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
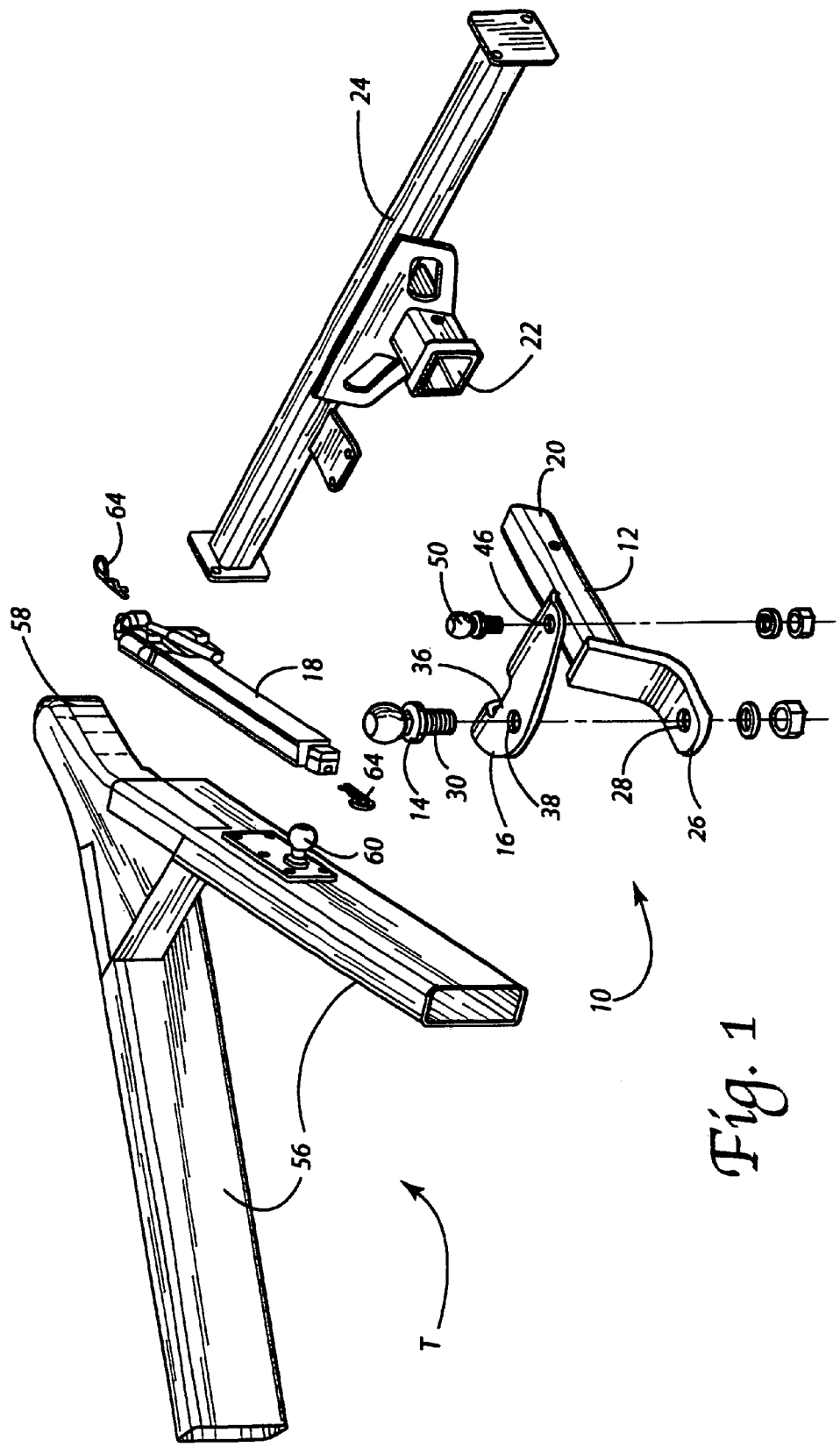
FIG. 1 is an exploded perspective view of the towing assembly of the present invention.
Figure 2:
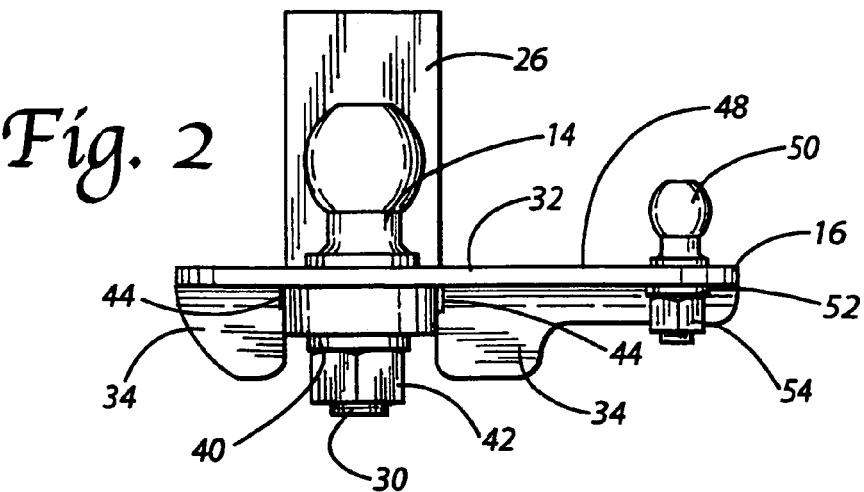
FIG. 2 is a detailed rear elevational view showing the connection of the conversion bracket to the draw bar by means of the hitch ball and cooperating hitch ball fastener.

Reference is now made to FIG. 1 generally showing the towing assembly 10 of the present invention. The towing assembly 10 comprises a draw bar 12, a hitch ball 14, a conversion bracket 16 and a sway control assembly 18.

More specifically, the draw bar 12 includes a first end 20 that is received in the hitch receiver box 22 of a trailer hitch receiver assembly 24 that is secured to a towing vehicle. Such trailer hitch receiver assemblies 24 are well known in the art. The second end 26 of the draw bar 12 forms a head including an aperture 28 that receives the threaded stem 30 of the hitch ball 14.

Figure 3:
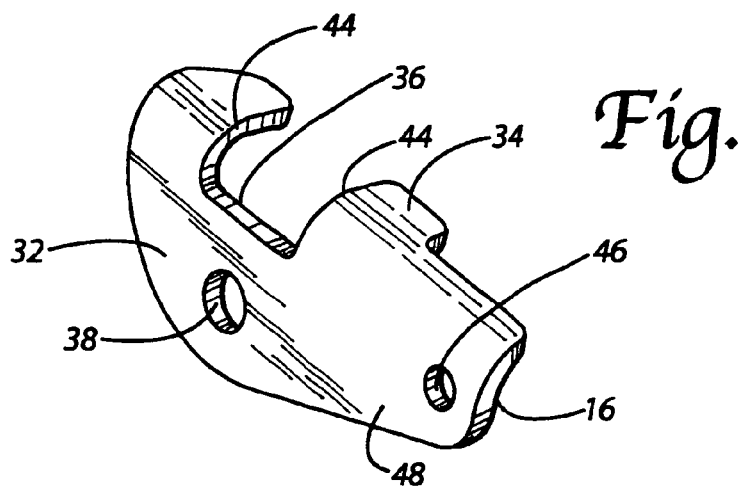
FIG. 3 is a detailed perspective view of the conversion bracket.
Figure 4:
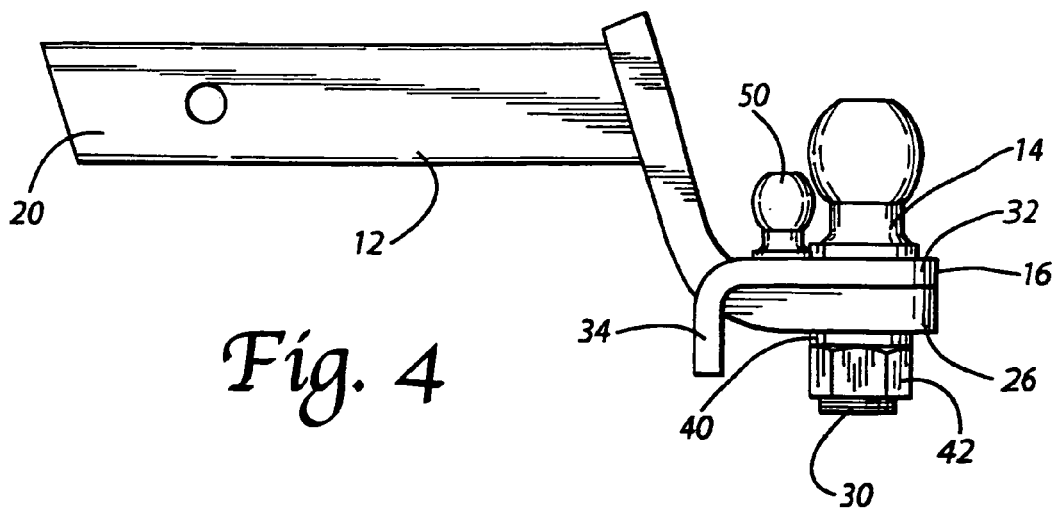
FIG. 4 is a left side end elevational view of the conversion bracket shown in FIG. 3.

The conversion bracket 16 includes a first section 32 that extends in a first plane and a second section 34 that extends in a second plane (note FIGS. 3 and 4). As shown the first and second sections 32, 34 define an included angle of approximately or about 90°. A notch 36 is formed in the first and second sections 32, 34 of the bracket 16. That notch 36 is sized and shaped to fit snugly around the second end or head 26 of the draw bar 12 when a hitch ball receiving aperture 38 in the first section 32 is aligned with the hitch ball receiving aperture 28 provided in the second end of the draw bar 12.

When the bracket 16 is properly seated on the second end 26 of the draw bar 12, the threaded stem 30 of the hitch ball is inserted in and passes through the aligned hitch ball receiving apertures 28, 38 in the draw bar 12 and bracket 16 respectively. The hitch ball 14, draw bar 12 and bracket 16 are then secured together by means of the hitch ball fastener which is illustrated in the drawing as comprising a lock washer 40 and cooperating nut 42. More specifically, first the lock washer 40 is placed over the stem 30 and then the nut 42 is tightened on the thread of the stem 30 of the hitch ball 14 so that the hitch ball, draw bar 12 and bracket 16 are secured tightly together. It should be noted that the edges 44 of the second section 34 of the bracket 16 defining the notch 36 engage the sides of the draw bar 12 so as to effectively prevent any rotation of the bracket 16 relative to the draw bar 12.

As further shown in the drawing figures, the first section 32 of the bracket 16 also includes a sway control mounting aperture 46 toward the end of the projecting portion or ear 48 of the bracket. A sway control connector such as a sway control receiving ball 50 is secured in this aperture 46. Specifically, as illustrated, the sway control connector 50 may include a threaded stem that is inserted through the aperture 46. A cooperating lock washer 52 and nut 54 are secured to the threaded stem and tightened in order to complete the connection.

The utilization of the towing assembly 10 of the present invention to tow a trailer will now be described in detail. Specifically, as best shown in FIG. 1, the trailer T includes a frame 56 that carries a towing socket 58 that is received around and cooperates with the head of the hitch ball 14. The frame 56 also carries a sway control connector 60 illustrated in the form of a ball. The sway control assembly 18 is connected between the two sway control ball connectors 50, 60 by means of cooperating fasteners 64 in a manner well known in the art. Substantially any type of sway control device known in the art to be useful for the control of trailer sway may be utilized including, for example, the sway control device disclosed in U.S. Pat. No. 4,165,885 to Good et al. and the friction sway control device presently marketed by Reese Products, Inc. of Elkhart, Ind. under part number 26660. Since such sway control devices are well known in the art and the specific design of the device is not material to the present invention, a further detailed description of the device is not provided.

If the operator desires to reverse the conversion of the standard draw bar 12 and hitch ball 14 so as to remove sway control connection capability, the operator need only remove the conversion bracket 16. In order to achieve this end, the trailer T is disconnected from the sway control assembly 18 and the hitch ball 14. The nut 42 is then removed from the stem 30 of the hitch ball 14 so that the hitch ball may be removed from the aligned apertures 28, 38 in the draw bar 12 and bracket 16 respectively. The bracket 16 is then lifted and removed from the second end 26 of the draw bar 12. The hitch ball 14 is then reinstalled on the draw bar 12 by inserting the threaded stem 30 through the aperture 28, positioning the lock washer 40 on the threaded stem and tightening the nut 42 thereon. Such a conversion is very simple and may be conveniently completed by the operator at any desired time. Reconversion to allow for sway control capability is just as simple and only requires reconnection of the conversion bracket 16 between the hitch ball 14 and draw bar 12 in the manner described above.

The foregoing description of the preferred embodiment of this invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An apparatus for converting a simple draw bar and hitch ball arrangement to allow sway control, comprising:
   a bracket including a first section extending in a first plane and a second section extending in a second plane;
   a notch formed in said bracket for receiving and engaging the draw bar; and
   a sway control connector connected to said bracket.

2. The apparatus of claim 1, wherein said bracket also includes a hitch ball receiving aperture.

3. The apparatus of claim 2, wherein said hitch ball receiving aperture is aligned with said notch.

4. A method for converting a simple draw bar and hitch ball arrangement to allow sway control for a trailer, comprising:
   securing a conversion bracket to said draw bar by means of said hitch ball, said conversion bracket including a first section extending in a first plane and a second section extending in a second plane; and
   connecting a sway control connector to said conversion bracket and connecting a sway control device to said sway control connector between said conversion bracket and the trailer.

5. The method of claim 4 including reversing the conversion by disconnecting said sway control device and removing said conversion bracket from said draw bar.

6. The method of claim 5, wherein removing said conversion bracket from said draw bar includes first removing said hitch ball.

7. The apparatus of claim 1, wherein the first and second sections of the bracket define an included angle of about 90°.

8. The apparatus of claim 3, wherein the draw bar further includes a hitch ball receiving aperture.

9. The apparatus of claim 8, further including a hitch ball inserted into the hitch ball receiving aperture of the bracket and the hitch ball receiving aperture of the draw bar.

10. The apparatus of claim 9, wherein a fastening device secures the hitch ball to the draw bar and the bracket.

11. The apparatus of claim 1, further including a sway control device.

12. The apparatus of claim 11, wherein the sway control connector removably connects the bracket with the sway control device.

13. The method of claim 4, further including connecting a sway control connector to said bracket wherein the sway control connector connects the bracket to the sway control device.

* * * * *

UNITED STATES PATENT AND TRADEMARK OFFICE
CERTIFICATE OF CORRECTION

| | | |
|---|---|---|
| PATENT NO. | : 7,029,020 B2 | Page 1 of 1 |
| APPLICATION NO. | : 10/838918 | |
| DATED | : April 18, 2006 | |
| INVENTOR(S) | : Katherin A. Adams | |

It is certified that error appears in the above-identified patent and that said Letters Patent is hereby corrected as shown below:

Please insert
In the specification:

Column 1, Line 67, Replace "racket" with --bracket--

Signed and Sealed this

Twenty-sixth Day of December, 2006

JON W. DUDAS
*Director of the United States Patent and Trademark Office*